United States Patent
Zimmer et al.

(10) Patent No.: US 6,513,185 B1
(45) Date of Patent: Feb. 4, 2003

(54) WINDSHIELD WIPER

(75) Inventors: Joachim Zimmer, Sasbach (DE); Norbert Wegner, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,744

(22) PCT Filed: Nov. 6, 1999

(86) PCT No.: PCT/DE99/03555
§ 371 (c)(1), (2), (4) Date: Dec. 1, 2000

(87) PCT Pub. No.: WO00/50277
PCT Pub. Date: Aug. 31, 2000

(30) Foreign Application Priority Data

Feb. 23, 1999 (DE) .......................... 199 07 630

(51) Int. Cl.⁷ .................................. B60S 1/46
(52) U.S. Cl. .............................. 15/250.04; 15/250.01; 15/250.07; 239/133; 239/284.1
(58) Field of Search ........................ 15/250.04, 250.01, 15/250.05, 250.07, 250.351; 239/133, 284.1, 284.2

(56) References Cited

FOREIGN PATENT DOCUMENTS

| DE | 313083 | * | 1/1974 | .............. 15/250.04 |
|---|---|---|---|---|
| DE | 37 44 237 A1 | | 7/1989 | |
| DE | 198 15 171 A1 | | 6/1999 | |
| EP | 353643 | * | 2/1990 | .............. 15/250.05 |
| EP | 0 667 267 A | | 8/1995 | |
| GB | 2 121 681 A | | 1/1984 | |
| WO | 90 10561 A | | 9/1990 | |

* cited by examiner

*Primary Examiner*—Gary K. Graham
(74) *Attorney, Agent, or Firm*—Michael J. Striker

(57) ABSTRACT

A windshield wiper has a wiper arm (10), which is driven via a drive shaft and is made up of a fastening element (12) and a hinge element (14), pivotably connected to it via a swivel joint (18). The hinge element has a wiper rod (36) to which a wiper blade (42) is pivotably connected, and at least one spray nozzle (42) is disposed on a pivotable part (10, 22), the spray nozzle communicating with a water pump via a water line (48). An electric resistance heating line (50, 60) in wire form is guided through the water line (48) and has two insulated current-carrying leads (64, 66), which on one end are electrically connected to one another and on that end, with the spray nozzle (42, 54) of a heating-conducting material, form a contact point (62, 68) with good heat transfer.

13 Claims, 2 Drawing Sheets

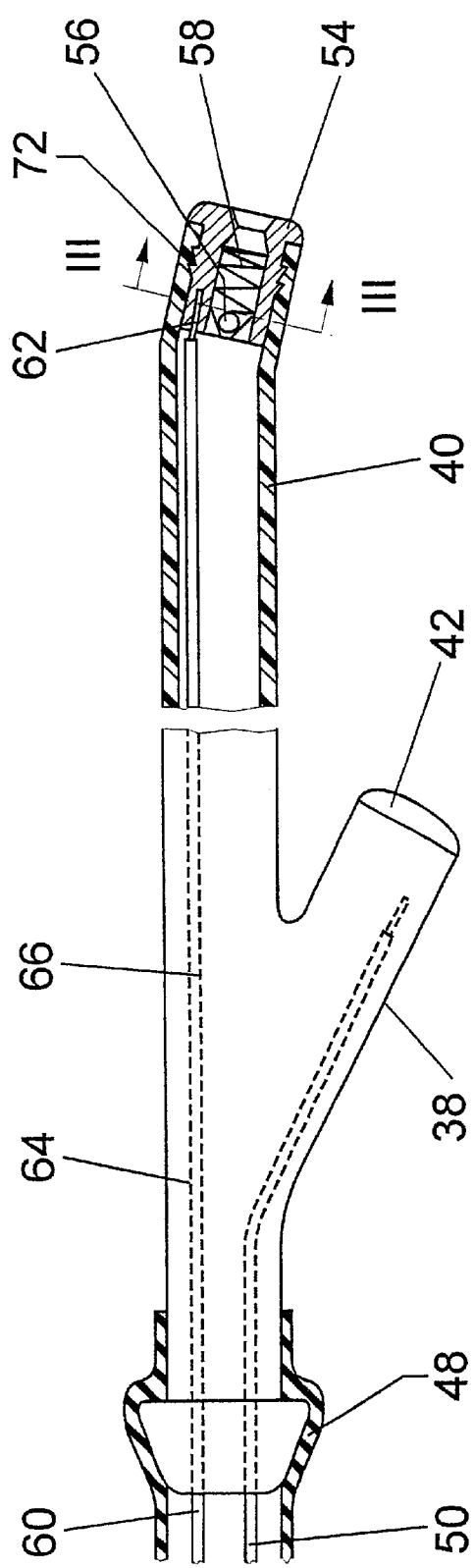

WINDSHIELD WIPER

BACKGROUND OF THE INVENTION

The invention relates to generally to windshield wiper having a wiper arm that is driven via a drive shaft and has a fastening element, a hinge element pivotally connected to the fastening element with a swivel joint, a wiper rod on which a wiper blade is pivotally connected, and a spray nozzle.

Known windshield wipers have a wiper arm, which is made up of a fastening element and a hinge element, which is pivotably connected to it via a swivel joint and has a wiper rod. A hooklike end of the wiper rod engages a suspension box of a wiper blade, which is formed by two side cheeks of a middle bracket and includes a hinge bolt. The hinge thus formed guides the wiper blade over the vehicle window during the swiveling motion. The wiper blade has what is as a rule a multi-member support bracket system, with subordinate brackets pivotably connected to the middle bracket, at least some of which subordinate brackets, with claws on their ends, retain a wiper strip by its head strip. The multi-member support bracket system and spring rails placed in the head strip make it possible during wiping for the wiper strip to adapt, with a uniform contact pressure, to a curved windshield. To that end, a tension spring prestresses the swivel joint. The wiper arm is secured with its fastening element on a drive shaft and is driven by it in the wiping motion.

Such windshield wipers are known, for instance from German Patent Disclosure DE 37 44 237 A1. In simple versions, subordinate brackets, also known as intermediate brackets and claw brackets, can be dispensed with. In the simplest case, the middle bracket itself has claws, with which it retains the wiper strip.

Windshield washing systems for vehicles are as a rule used in conjunction with windshield wipers. They are actuated if the moisture from precipitation does not suffice to clean the vehicle window. They include a water container, spray nozzles, and a pump which pumps water, sometimes admixed with cleaning and antifreeze agents, under pressure out of the water container to the spray nozzles. As a rule, the spray nozzles are secured to some part of a vehicle body, such as a hood, window frame, or the like. To prevent the spray nozzles from freezing at temperatures below the freezing point, heating elements are integrated into the spray nozzles and communicate with a power supply via plugs located on the outside. The heating elements require relatively great effort and expense for producing the spray nozzles and great effort and expense for assembly for laying the electric lines and contacting the plugs.

It is already known for spray nozzles to be secured as additional components to the wiper blade and thus for the spray water to be distributed over the wiping region directly with a short length of stream. Since the spray water is concentrated on a region in the vicinity of the wiper blade and is washed off again within the shortest possible time by the wiping motion, the view is hindered only briefly by the spray water applied. One disadvantage of such systems is that the effects of weather, especially hail and strong sunshine, greatly affect the flexible parts of this arrangement, which are needed for spanning the hinged regions between the wiper arm and the wiper blade. Furthermore, the spray nozzles and water lines, which are exposed to the relative wind, rapidly freeze closed at temperatures below the freezing points, unless antifreeze is admixed with the water. Frozen water lines and spray nozzles can be defrosted again as a rule only with great effort.

In an earlier German Patent Application, DE 198 15 171.3, a wiper arm is described on the hinge part of which, or a wiper rod integrally connected to the hinge part, spray nozzles are disposed. The spray nozzles are located in a nozzle body, which is accommodated in a bulge of the hinge part that has an injection opening for the spray stream, or is clipped, protruding downward, in a lateral mount on the wiper rod. It is also possible for two nozzle bodies to be provided, which are joined to one another by means of a rigid or flexible connecting piece. The nozzle bodies are easily replaced and are well protected from environmental factors.

A heating device, passed in the form of a wire through a water supply line and embodied as a heating coil in the nozzle body, is integrated into windshield wiper system. The heating device fits only one type of windshield wipers, so that a large number of different heating devices have to be kept on hand. Furthermore, simple solutions are obtained by providing that the nozzle bodies are integrally joined together and are produced from plastic as an injection-molded part. By means of the nozzle bodies distributed along the wiper arm, the spray water is well distributed over the wiping region, especially if a spray stream is directed into a lower region directly in front of the wiper blade. Since this arrangement results in short stream lengths, the relative wind can have only little effect on spray water distribution, even at a relatively high vehicle speed.

SUMMARY OF THE INVENTION

According to the invention, an electric resistance heating line in wire form is guided through the water line to the spray nozzles and has two insulated, current-carrying leads. The leads are connected on one end to an electric power supply, while on their other end they are connected to one another and together with the spray nozzle, which is made from a heat-conducting material, form a contact point with good heat transfer. The heat is transferred on the one hand from the heating line to the water in the water line and on the other via the contact point to the heat-conducting spray nozzle. The heating element is the same for both the spray nozzle and the water line and can be adapted easily to given structural conditions. The heating line requires no additional space and does not adversely affect the appearance. The heated water improves the cleaning action, so that the water consumption, and especially the especially the consumption of polluting additives, can be reduced. Finally, the installation is very simple, since an external plug connection on the nozzle is not needed, and the electrical contacting entails only slight costs, since the electric power supply is made only via a plug at the water supply.

To improve the heat transfer at the contact point, it is expedient to strip off the insulation of the current-carrying leads in the region of the contact point, so that the leads are bare where they rest on the spray nozzle of conductive material. The contact point can be embodied as a bore in the spray nozzle, into which the heating line is inserted. The ends of the leads can be retained by a conventional plug connection or soldered in place. An especially advantageous version is obtained if the spray nozzle is inserted in a nozzle body. In that case, the contact point can be formed by clamping, wedging and/or gluing the heating line in a joining gap between the nozzle body and spray nozzle. If the nozzle body is made from metal, an especially good heat transfer is obtained from the heating wire to the region of the spray nozzle. The nozzle body is expediently made from plastic. This provides thermal insulation from the outside, so that the heat output is concentrated in particular on the spray nozzle and the water. This leads to reduced energy consumption.

The joining gap is widened in the region of the contact point, to assure the sealing off from the outside. This sealing is typically achieved by means of a press fit between the spray nozzle and the nozzle body. It can be improved by means of a detent and sealing device that retains the spray nozzle in the nozzle body. Upon installation, the spray nozzle is clipped into the nozzle body, and at the same time the electrical and thermal contact with the heating line is made at the contact point.

Expediently, the spray nozzle has an outward-opening check valve, which prevents the water line from running empty if the windshield washer is not used for a long time. If the water line is only partly filled, the heat transfer to the water is impeded. Furthermore, water residues can become locally overheated and evaporate. This leads to calcium deposits, which over the course of time clog up the narrow channels in the spray nozzle.

The cleaning action can be improved by a plurality of spray nozzles that are disposed on the wiper arm, spaced a few centimeters apart from one another. To make installation easier, the nozzle bodies of the individual spray nozzles are integrally joined to one another and are connected to the water line. Furthermore, separate heating lines lead to the individual spray nozzles, to prevent all the water channels and spray nozzles from freezing shut at temperatures below the freezing point.

DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will also expediently consider the characteristics individually and combine them into suitable further combinations.

Shown are:

FIG. 2, a fragmentary longitudinal section through a spray nozzle assembly with two spray nozzles;

FIG. 3, a section taken along the line III—III of FIG. 2; and

FIG. 4, an alternative to FIG. 3.

DETAILED DESCRIPTION OF THE PREFERRED EMBODIMENTS

Figure 1:
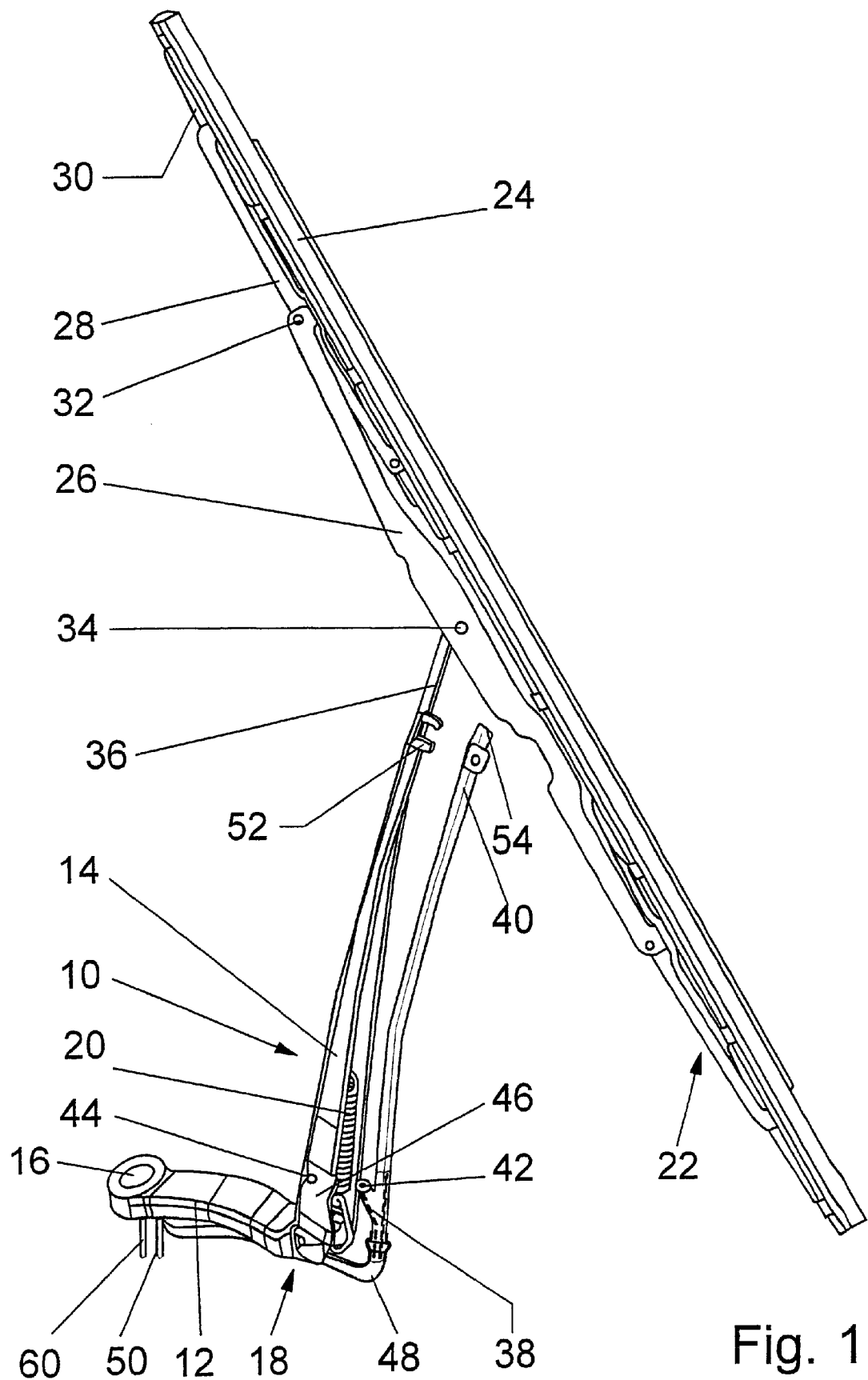
FIG. 1, a perspective view of a windshield wiper according to the invention, in a position swiveled out of the way.

The windshield wiper of FIG. 1 has a wiper arm 10, which is made up of a fastening element 12 and a hinge element 14 with a wiper rod 36. The fastening element 12 has a receiving bore 16, with which it is secured to a drive shaft, not shown. The hinge element 14 is pivotably connected via a swivel joint 18 to the fastening element 12, which is prestressed via a tension spring 20 spring mechanism, which engages the fastening element 12 and the hinge element 14. The tension spring wo thus on the one hand presses the wiper blade 20, via the wiper arm 10, against a vehicle window and on the other keeps the hinge element 14 with the wiper rod 36 in a position pivoted out of the way, to make it possible to clean or change the wiper blade 20.

The wiper blade 22 has a middle bracket 26, intermediate bracket 28 and claw bracket 30, which retain a wiper strip 24. The aforementioned brackets 26, 28 and 30 are pivotably connected to one another via hinge pins 32, so that the wiper strip 24 can adapt to the curvature of a vehicle window. With one end, the wiper rod 36, which is expediently formed integrally onto the hinge element 14, surrounds a hinge bolt 34 in the middle bracket 26 and thus forms a hinge with it.

The hinge element 14 and the wiper rod 36 formed onto it have an open U-shaped profile, into which a nozzle body 38 with a spray nozzle 42 let into it is inserted from below. The nozzle body 38 is disposed in the region of the tension spring 20, in a bulge 46 that has a spray opening 44 for the spray nozzle 42. At least one further nozzle body 40 with a spray nozzle 54 is clipped, spaced apart from the nozzle body 38 in the region of the wiper rod 36, into a retainer 52 on the end that is close to the hinge bolt 34. The nozzle bodies 38, 40 are joined together flexibly or rigidly and are expediently embodied integrally. They can easily be made from plastic as injection molded parts. They are also simple to replace or to add by retrofitting and they allow preadjustment of the spray nozzles.

The nozzle bodies 38, 40 are connected to a water line 48. Two heating lines 50, 60, each leading to a respective spray nozzle 42 and 54, are guided through the water line. The heating lines 50, 60 have two insulated, current-carrying leads 64, 66, which have an elevated line resistance and which on their ends, together with the spray nozzles 42, 54, form contact points 62, 68. The spray nozzles 42, 54 comprise a material, such as a metal, that is a good heat conductor. As a result there is a good heat transfer on the one hand from the contact point 62, 68 to the spray nozzle 42, 54 and on the other from the water, which is heated by the heating line 50, 60, to the spray nozzle 42, 54.

To improve the heat transfer at the contact point 62, 68, the insulation is stripped from the heating lines 50, 60 in the region of the contact point 62, 68, so that the ends of the leads 64, 66 are bare. As FIGS. 2 and 3 show, the bare ends of the leads 64, 66 at the contact point 62 are inserted into a bore of the spray nozzle 54, being soldered, plugged-in or glued there, for example. In the version of FIG. 4, the contact point 68 is formed by clamping the bare ends of the leads 64, 66 in a widened joining gap 70 between the nozzle body 40 and the spray nozzle 54. The contact point 68 can be made in a simple way upon installation of the spray nozzle 54, with the length of the heating line 50, 60 adapted to given structural conditions. The installation is also made easier by the fact that in a variant the spray nozzle 54 is clipped into the nozzle body 40. A detent and sealing device 72, which retains the spray nozzle 54 in the nozzle body 40, seals off the joining gap 70 from the outside. In many cases, it suffices for the spray nozzles 42, 54 to be press-fitted into the nozzle bodies 38, 40 and for the joining gap 70 to be sealed off by a press fit.

The nozzle bodies 38, 40, which are expediently embodied integrally, are made from plastic as injection molded parts. As a result, the water in the nozzle bodies 38 and 40 is thermally insulated, so that even at low temperatures, only a slight heating capacity is required.

The spray nozzles 42, 54, which are embodied identically, have a check valve 56, which is loaded by a spring 58 and opens outward. Water can thus reach the outside only if the pressure in the nozzle body exceeds the force of the spring 58 and the spray nozzles 42, 54 do not drip. The channels in the nozzle bodies 38, 40 and in the water line 48 are also prevented from running empty. If the nozzle bodies 38, 40 and the water line 48 are only partly filled, the heat transfer from the water to the spray nozzles 42, 54 is impeded. The remaining water can also become locally overheated and evaporate, causing calcium deposits that plug up the spray nozzles 42, 54.

What is claimed is:

1. A windshield wiper having a wiper arm (10), which is driven via a drive shaft and is made up of a fastening element (12) and a hinge element (14) pivotably connected to said fastening element (12) via a swivel joint (18) and being a first pivotable part, the hinge element having a wiper rod (36) to which a wiper blade (22) is pivotably connected, the wiper blade being a second pivotable part, and at least one spray nozzle (42) disposed on one of said pivotable parts (10, 22), the spray nozzle communicating with a water pump via a water line (48), characterized in that an electric resistance heating line (50, 60) in wire form is guided through the water line (48) and has two insulated current-carrying leads (64, 66), wherein said current-carrying leads are electrically connected to one another into a single strand near said spray nozzle (42, 54), wherein said strand is in contact with the spray nozzle (42, 54), wherein said contact strand has heat transfer ability, and wherein said spray nozzle comprises a heat conducting material.

2. The windshield wiper of claim 1, wherein the leads (64, 66) are bare in a region of the contact strand (62, 68).

3. The windshield wiper of claim 1, wherein a plurality of spray nozzles (42, 54) are connected to one water line (48), and separate heating lines (50, 60) lead to said plurality of spray nozzles (42, 54).

4. The windshield wiper of claim 3, wherein each of said plurality of spray nozzles (42, 54) is inserted into a respective nozzle body (38, 40), wherein the nozzle bodies (38, 40) are integrally joined to one another by means of two spray nozzles (42, 54).

5. The windshield wiper of claim 1, wherein the spray nozzle (42, 54) is inserted into a nozzle body (38, 40).

6. The windshield wiper of claim 5, wherein the nozzle body (38) is made from plastic.

7. The windshield wiper of claim 1, wherein the heating line (50, 60) is inserted at the contact strand (68) into a bore in the spray nozzle (54).

8. The windshield wiper of claim 7, wherein the contact strand (68) is a plug connection.

9. The windshield wiper of claim 7, wherein the contact strand (68) is formed by a soldered connection.

10. The windshield wiper of claim 1, wherein the spray nozzle (54) is retained in a nozzle body (38, 40), and wherein the heating line (60) is clamped at the contact strand (68) in a joining gap (70) between the nozzle body (40) and the spray nozzle (54).

11. The windshield wiper of claim 10, wherein the joining gap (70) is widened in a region of the contact strand (68).

12. The windshield wiper of claim 1, wherein the spray nozzle (42, 54) is retained in a nozzle body (38, 40) via a detent and sealing device (72).

13. The windshield wiper of claim 1, wherein the spray nozzle (42, 54) has an outward-opening check valve (56).

* * * * *